US00H002230H

(19) United States
(12) Statutory Invention Registration
Nechitailo

(10) Reg. No.: US H2230 H
(43) Published: Aug. 4, 2009

(54) CERAMIC AND STACKED PENETRATOR AGAINST A HARDENED TARGET

(75) Inventor: Nicholas V. Nechitailo, King George, VA (US)

(73) Assignee: The United States of America as represented by the Secretary of the Navy, Washington, DC (US)

(21) Appl. No.: 11/645,262

(22) Filed: Nov. 30, 2006

(51) Int. Cl.
*F42B 10/00* (2006.01)

(52) U.S. Cl. ..... 102/517; 102/489; 102/506; 102/518; 102/515

(58) Field of Classification Search ..... 102/489, 102/506, 517, 518, 519
See application file for complete search history.

(56) References Cited

U.S. PATENT DOCUMENTS

| | | | | | |
|---|---|---|---|---|---|
| 1,388,503 | A | * | 8/1921 | Ayer | 102/454 |
| 2,022,137 | A | * | 11/1935 | Makaroff | 102/519 |
| 2,766,692 | A | * | 10/1956 | Mynes | 102/449 |
| 3,059,578 | A | * | 10/1962 | Hegge et al. | 102/506 |
| 3,370,535 | A | * | 2/1968 | Permutter | 102/518 |
| 3,566,793 | A | * | 3/1971 | Kruzell | 102/374 |
| 3,862,600 | A | * | 1/1975 | Tocco | 102/438 |
| 4,108,072 | A | | 8/1978 | Trinks et al. | 102/518 |
| 4,216,722 | A | * | 8/1980 | Angell | 102/491 |
| 4,353,305 | A | * | 10/1982 | Moreau et al. | 102/519 |
| 4,635,556 | A | | 1/1987 | Boecker et al. | 102/514 |
| 4,700,630 | A | * | 10/1987 | Sullivan | 102/439 |
| 4,708,064 | A | | 11/1987 | Bisping | 102/517 |
| 4,716,834 | A | | 1/1988 | Wallow et al. | 102/519 |
| 4,850,278 | A | | 7/1989 | Dinkha et al. | 102/501 |
| 4,878,432 | A | | 11/1989 | Mikhail | 102/309 |
| 4,882,996 | A | * | 11/1989 | Bock et al. | 102/496 |
| 4,913,054 | A | * | 4/1990 | Petersen | 102/439 |
| 4,920,888 | A | | 5/1990 | Luther et al. | 102/518 |
| 4,961,384 | A | * | 10/1990 | Sayles | 102/519 |
| 5,105,713 | A | | 4/1992 | Wirgau | 89/8 |
| 5,164,538 | A | * | 11/1992 | McClain, III | 102/517 |
| 5,440,994 | A | * | 8/1995 | Alexander | 102/439 |
| 5,526,752 | A | | 6/1996 | Dahl et al. | 102/517 |
| 5,817,969 | A | * | 10/1998 | Ettmuller | 102/489 |
| 5,834,684 | A | | 11/1998 | Taylor | 102/517 |
| 5,864,086 | A | * | 1/1999 | Ettmuller | 102/489 |
| 5,988,071 | A | | 11/1999 | Taylor | 102/473 |
| 2003/0167956 | A1 | * | 9/2003 | Kellner | 102/517 |

* cited by examiner

*Primary Examiner*—Michelle Clement
(74) *Attorney, Agent, or Firm*—Gerhard W. Thielman

(57) ABSTRACT

A projectile for penetrating hardened targets is provided to include a shell having a longitudinal axis substantially perpendicular to an impact surface of the target; and a plurality of penetrator elements disposed in tandem in the shell along the longitudinal axis. The penetrator elements may be composed of ceramic, which has high compressive strength relative to most metals. Selected portions of the penetrator may be composed of heavy metals. The penetrator elements may be separated from each other by gaps, which may be filled with foam or other shock-absorbing material. An alternate projectile provides a unitary penetrator element composed of ceramic.

18 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CERAMIC AND STACKED PENETRATOR AGAINST A HARDENED TARGET

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to penetrator elements in a projectile for perforating a thick-wall target, and more particularly to ceramic and multi-impact penetrators to deepen a crater in the target.

A hardened target presents challenges for a projectile delivered from an aerial platform due to payload mass and other design restrictions. The transportable quantity of explosive charge in the projectile limits capacity to penetrate a deeply buried target protected by extensive material to absorb the kinetic energy from impact and chemical reaction of the projectile.

Further, premature initiation of energetic materials in the projectile may produce only superficial damage to the hardened target. Such penetration may be obviated by kinetic energy transfer from a projectile to the target. However, the hardened target may absorb such an impact without sufficient damage for disablement.

SUMMARY

Conventional projectile weapons yield disadvantages addressed by various exemplary embodiments of the present invention. In particular, the delivery of kinetic energy from a projectile to a target may include concatenated penetrator elements serially disposed along the longitudinal axis. Other various embodiments alternatively or additionally provide for the penetrator elements being composed of a high-strength non-metal such as a ceramic.

Various exemplary embodiments provide a projectile for penetrating hardened targets including penetrator elements contained a shell. The elements are disposed within the shell in tandem. The shell includes a longitudinal axis along which the elements are aligned, the axis being substantially perpendicular to an impact surface of the target. The penetrator elements may be composed of ceramic, which has high compressive strength relative to most metals. Selected portions of the penetrator may be composed of heavy metals. The penetrator elements may be separated from each other by gaps, which may be filled with foam or other shock-absorbing material. Other various embodiments provide for a unitary penetrator element composed of ceramic.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

Figure 1:
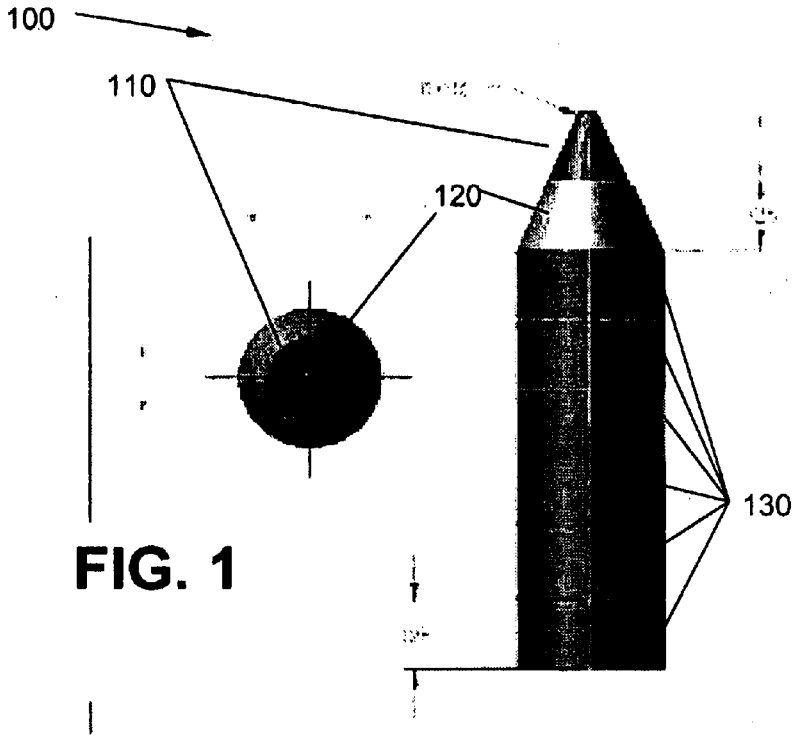
FIG. 1 is a penetrator projectile in plan and elevation views.

In the following detailed description of exemplary embodiments of the invention, reference is made to the accompanying drawings that form a part hereof, and in which is shown by way of illustration specific exemplary embodiments in which the invention may be practiced. The embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

A target-penetrating projectile may include one or more penetrator element fragments intended to impact (i.e., physically contact) a target, thereby transferring kinetic energy thereto to cause deformation damage. The projectile may include a shell to contain the impaction elements, as well as auxiliary or optional components, such as chemical propellants, explosive charge, guidance and control systems, etc. These fragments may be variously labeled penetrator elements or projectiles. A sufficiently energetic impact may serve to penetrate the target's outer casing. However, a single fragment that impacts an otherwise undamaged portion of the target may not impart sufficient energy to produce such damage. Due to scatter, multiple fragments from a single projectile may only randomly strike the target in broad distribution.

Consequently, various exemplary embodiments for a projectile provide for a series of penetrator elements concatenated in tandem (i.e., one-behind-the-other, single file, front-to-back) to sequentially impact the target thereby forming a deformation cavity. Several small projectiles may be packaged together in a stack to maintain alignment during impact. The stack arrangement enables each penetrator element to successively deepen the cavity until breach of the target's outer casing, which may be composed of various impact-resistant materials, such as a concrete slab or armor plate.

In particular, the projectile contains several penetrators that are segmented and sequentially arranged in columnar fashion. This configuration contrasts with continuous-rods hinged together that remains folded in the delivery vehicle and expands on command. Continous long rods may impart energy to the target by impact thereagainst at a position substantially parallel (i.e.,tangent) to the target surface. Such rods may be characterized as having a high aspect (length to diameter or width) ratio (i.e., slender).

In addition, shock waves propagating along the length of continuous rods from impact end to opposite end may reflect from the rod's rear surface occasionally inducing a tensile wave. This tensile wave may propagate back to the rod's impact end causing tensile failure, particularly in brittle metals and ceramics typically having high compressive strength and low tensile strength. The same failure mode may be observed in the radial direction for shock wave reflection from the rod outer surface producing radial tensile failure zones.

In many cases, the tensile failure zones may be attributed to combined tensile waves propagating along the rod length and rod radius. In addition, slender continuous-rods generally have limited effectiveness against a reinforced or thick-wall target due to their limited compression resistance in the axial direction. These rods may buckle and fracture prior to achieving significant damage to the target.

By comparison, the columnar configuration (i.e., having a longitudinal axis substantially perpendicular to the target surface) maintains integrity in longitudinal compression of the projectile, thereby enabling deeper target penetration. The projectile may include penetrator elements, such as cylinders in an array along a longitudinal axis of symmetry. Such penetrator elements may be characterized as having a low aspect ratio (i.e., short and stubby).

Each cylinder penetrator element may separately collide with the target at the same location in concatenated sequence, thereby facilitating multiple strikes the same location and thereby deeper penetration at the impact location. Alternatively, the columnar configuration may include a single penetrator element having a moderate to high aspect ratio. Those of ordinary skill will recognize that a projectile may include separate multiple stacks, each being substantially perpendicular to the target surface at different locations.

The penetrator elements may include different diameters along the length of their containing array and may provide self-sharpening upon impact. These penetrator elements may be separated by gaps or spaces, which may be filled with shock-absorbing material, such as epoxy or rubberized foam. Artisans of ordinary skill will recognize that the penetrator elements may represent other shapes arranged along a longitudinal axis, and preferably in a substantially axi-symmetric pattern. Moreover, such artisans will recognize that the shock-absorbing material intended to cushion the penetrator elements may preferably be of much softer material than the penetrator elements themselves.

Figure 2A:
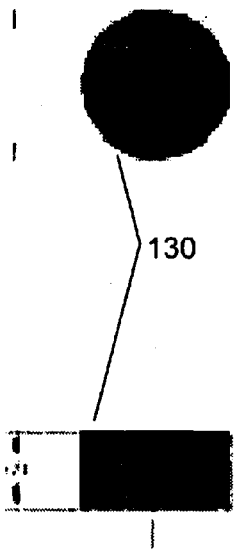
FIGS. 2A, 2B and 2C are plan and elevation views of penetrator components.
Figure 2B:
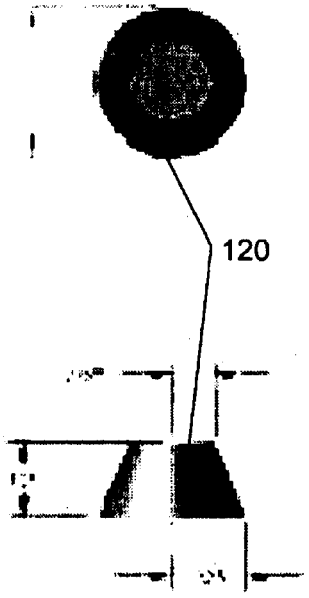
Figure 2C:
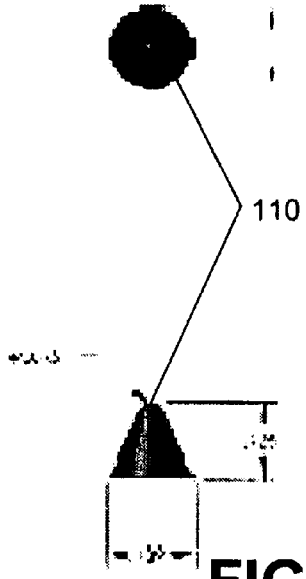

FIG. 1 illustrates plan and elevation views of the projectile penetrator 100, which includes a cone tip 110, a conical fustum 120 and a stack of solid cylindrical disks or pucks 130 arranged sequentially along a longitudinal axis of symmetry. FIGS. 2A–2C show the individual components separately. In particular, FIG. 2A provides plan and elevation views of an isolated cylindrical puck 130. FIGS. 2B and 2C illustrate plants and elevation views of the frustum 120 and tip 110, respectively. Exemplary dimensions of the components for the penetrator 100 may be provided as follows: each segment 110, 120, 130 may possess a height of 0.125 inch; with an overall radius of 0.125 inch. The first two segments 110, 120 may be cylindrical rather than conical or frustum.

Each segment 110, 120, 130 may be composed of separate materials, depending on their position relative to initial impact. For example, for penetration, the first two segments 110, 120 may be composed of a hard dense metal, such as depleted uranium. The gaps between the segments may be filled with foam or other spacing material, or may include a clamp to inhibit inertial momentum of further aft segments 130 relative to each other and thereby maintain separation distance. The clamp may be attached to a containment shell that maintains the segments. The further-aft segments 130 may be ceramic, metal and/or reactive material. The furthest-aft segment(s) may preferably be composed of a frangible material to absorb reflected wave energy transmitted through the segments upstream.

Several ceramic and ceramic-based composites are commercially available and several super-hard nano-composites are under development. Examples of ceramic materials include diamond, tungsten carbide, silicon carbide, aluminum oxide, beryllium oxide, magnesium oxide, and zirconium oxide. In preferred embodiments, ceramic materials have high Hugoniot elastic limit (HEL), commonly used to characterize material impact strength, as well as high mass density and low cost.

At the impact speeds typically above 2–3 km/s, these ceramic materials exhibit very high impact strength and thermal stability offering superior penetration properties over high-strength metals. Also, some launching methods, such as by railgun, provide for a more gradual acceleration of projectile as compared to explosive launch. More gradual acceleration of projectiles produce lower level of tensile waves traveling in the projectile materials and thus may produce less damage to brittle ceramic-type materials.

As example, tungsten carbide (WC, $W_2C$) ceramic is a high-density material with attractive compressive and tensile strength properties. Cercom, Inc., at 991 Park Center Dr, Vista Calif. 92081, manufactured hot-pressed tungsten carbide ceramic. The density and HEL of tungsten carbide varies between 15.53 and 15.56 g/cm$^3$ and 6.6±0.5 GPa, respectively. By comparison, one of the best commonly-used penetrating metal—tungsten alloy containing tungsten (W), nickel (Ni), and iron (Fe) in the ratio of 92.85:4.9:2.25 by weight has an HEL near 2.76±0.26 GPa. This tungsten alloy deforms plastically above its HEL, and its spall strength is determinded as 1.9 GPa.

Reactive materials generally include particles or powdered forms of one or more reactive metals, one or more oxidizers, and typically some binder materials. The reactive metals may include aluminium (Al), beryllium (Be), hafnium (Hf), lithium (Li), magnesium (Mg), thorium (Th), titanium (Ti), uranium (U) and zirconium (Zr), as well as combinations, alloys and hydrides thereof. The oxidizers may include chlorates, such as ammonium perchlorate ($NH_4ClO_4$), lithium perchlorate ($LiClO_4$), magnesium perchlorate ($Mg(ClO_4)_2$), potassium perchlorate ($KClO_4$), peroxides, and combinations thereof. The binder materials typically include epoxy resins and polymeric materials. Commonly used materials that may release pressurized gaseous products upon impact include aluminium (Al)—Teflon (Polytetrafluorethylene or PTFE), hafnium (Hf)—fluoropolymer e.g., THV500) reactive materials as well as a number of aluminium alloys.

The serially concatenated segments 130 may be modeled as a discretized continuous rod directed to translate along its longitudinal axis for impact against a target locally characterized as a discretized flat plate. Physical properties of the discrete elements may characterize a homogenous monolith or selectively imposed to describe specific materials.

Figure 3:
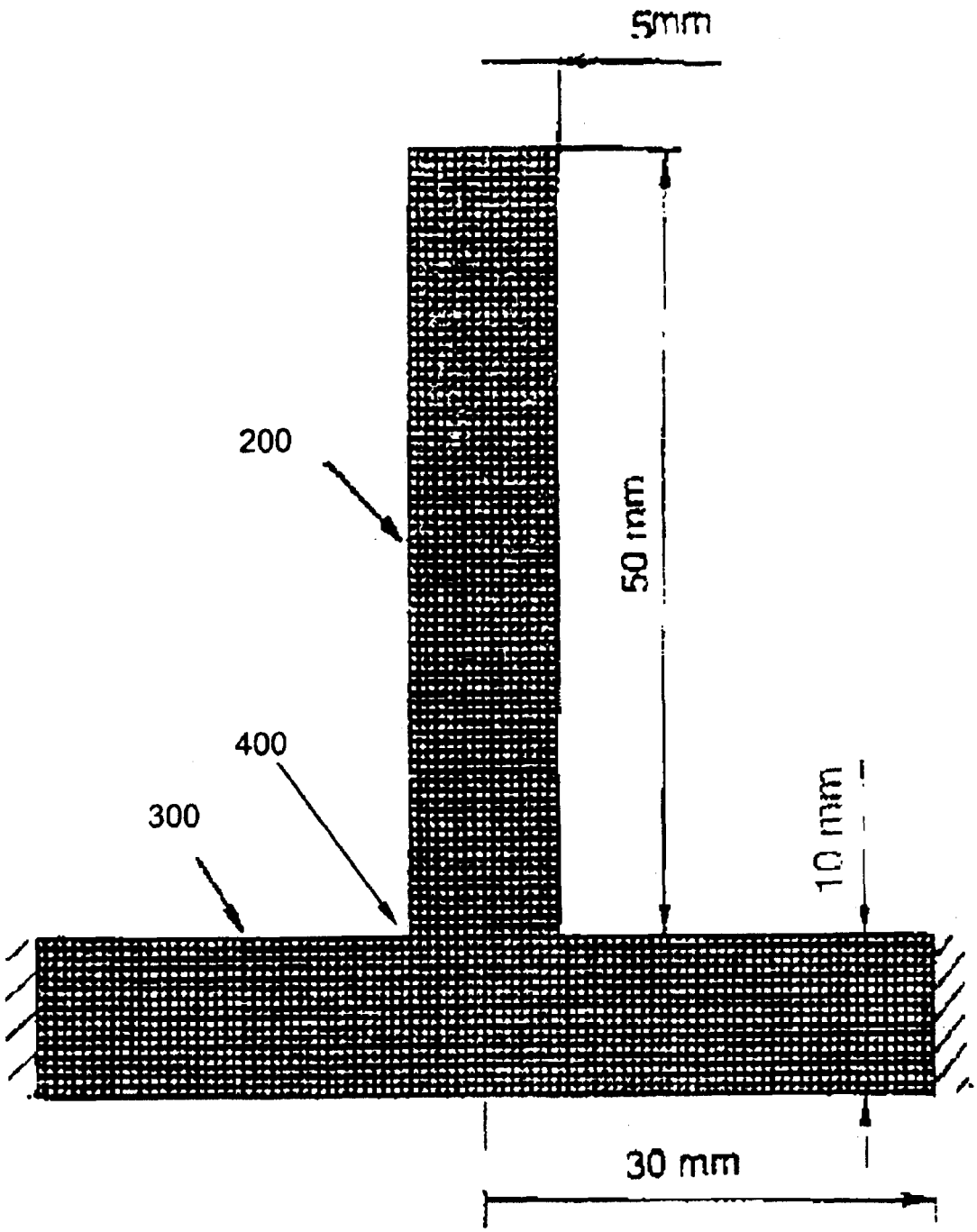
FIG. 3 is a finite-element axi-symmetric cross-section view of a unitary ceramic penetrator in non-kinetic contact with a metal target.

FIG. 3 shows an axi-symmetric finite element model of a ceramic penetrator 200 in static flush contact with a fixed metal target 300 at an interface 400. The penetrator 200, made of unitary (single-piece) cylinder of commercially available low-cost AD-85 alumina, possesses a flat nose tip and may be disposed with its longitudinal axis perpendicular to the surface of the target 300. Alternatively, the nose tip may be ogive in shape. Exemplary dimensions of the penetrator include: penetrator radius of 5 mm and penetrator length of 50 mm (along the axis). Exemplary dimensions of the target include: target thickness of 10 mm and target axi-symmetric radial width of 30 mm.

Figure 4A:
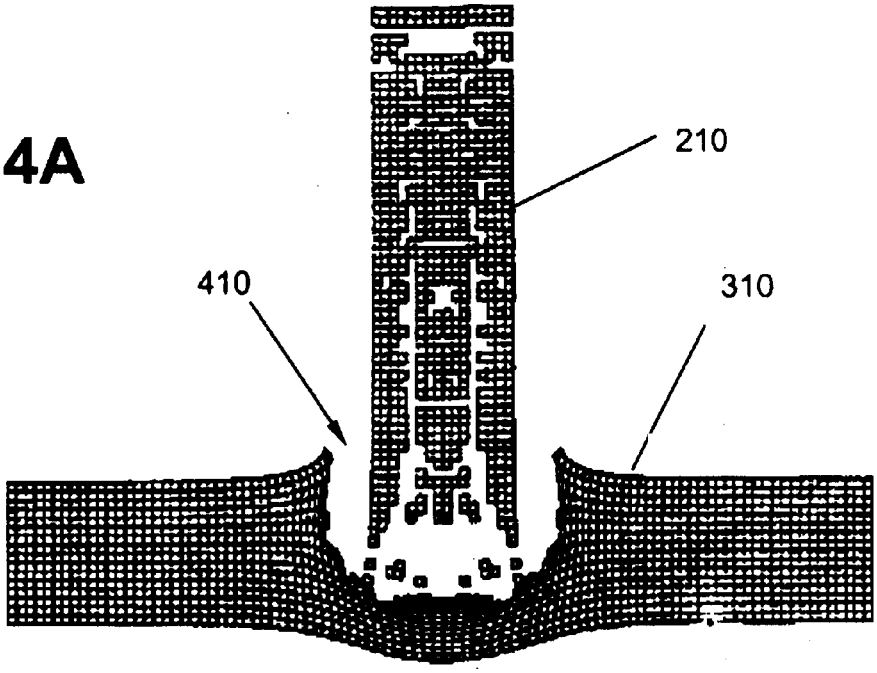
FIGS. 4A, 4B and 4C are finite-element axi-symmetric cross-section views of a ceramic penetrator striking an aluminum target.
Figure 4B:
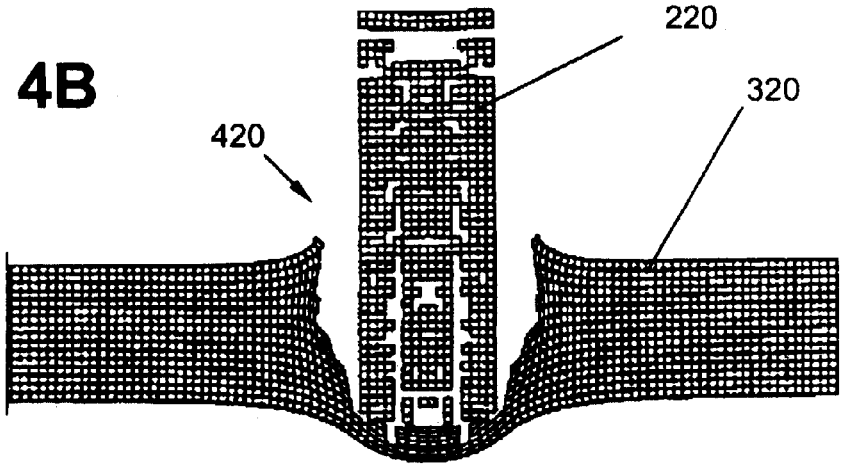
Figure 4C:
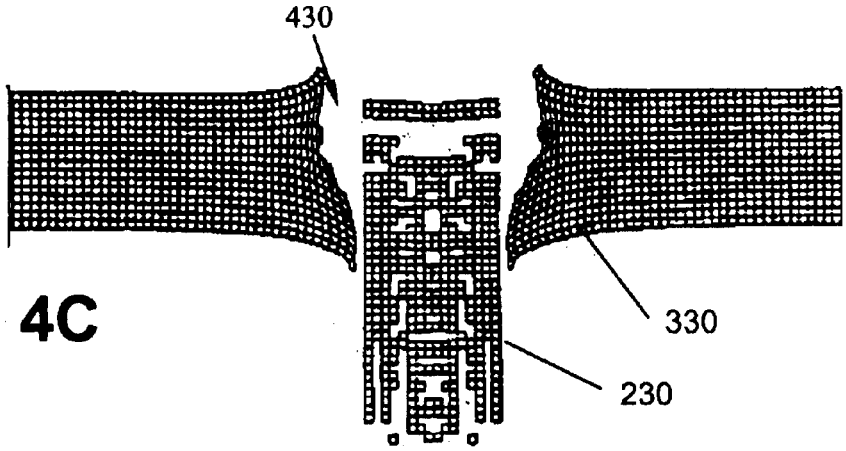

FIGS. 4A through 4C show results of the finite element modeling of a ceramic penetrator with a flat tip after impacting an aluminum plate target at a velocity of 2.0 km/sec. Penetrator 210 in FIG. 4A fragments both radially at the tip and longitudinally at 8.39 μsec after impact of target 310 causing crater 410 at the interface. Further, penetrator 220 in FIG. 4B at 0.016 msec after impact of target 320 produces deeper crater 420. Finally, penetrator 230 in FIG. 4C at 0.026 msec after impact erupts through the thickness of target 330 producing a through-cavity 430. At this impact speed, the penetrator progressively exhibits longitudinal fractures that cause its length to shorten. Similar perforation modes have been observed in the finite element modeling of AD-85 ceramic projectiles against 4340-steel plates at 3 km/s impacts.

FIGS. 5A through 5F show finite element model results of the ceramic penetrator having an initially flat tip that exhibits self-sharpening (i.e., chamfer erosion of the flat nose edges and nose transition to conical shape) after impacting an aluminum target at a velocity of 5.0 km/sec. This self-sharpening phenomenon is known for projectiles made of depleted uranium and is used to achieve superior penetration depth (as compared, for example with tungsten alloys that expand upon impact). Finite element modeling enabled discovery of similar self-sharpening phenomenon in ceramic projectiles, representing an important result. At this high velocity, the penetrator also demonstrates multiple impacts against the target and better integrity than at the lower speed.

Figure 5A:
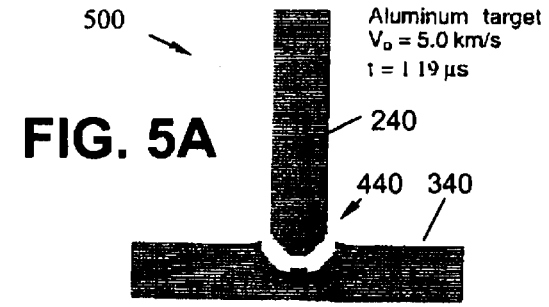
FIGS. 5A, 5B, 5C, 5D, 5E and 5F are finite element axi-symmetric cross-section views of a ceramic penetrator striking an aluminum target.
Figure 5B:
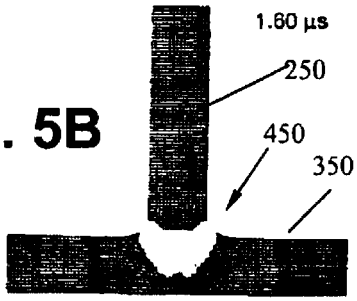
Figure 5C:
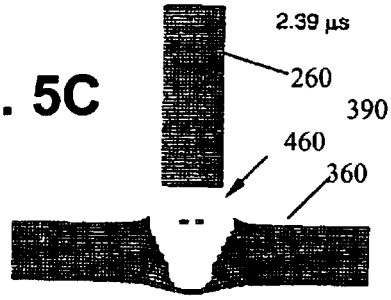
Figure 5D:
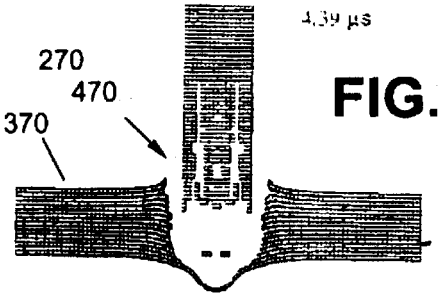
Figure 5E:
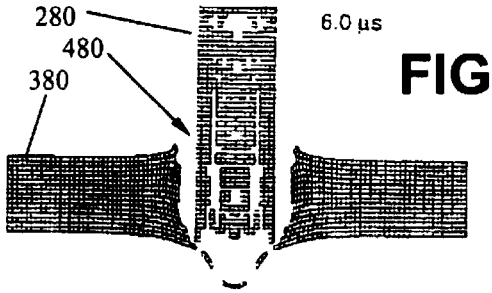
Figure 5F:
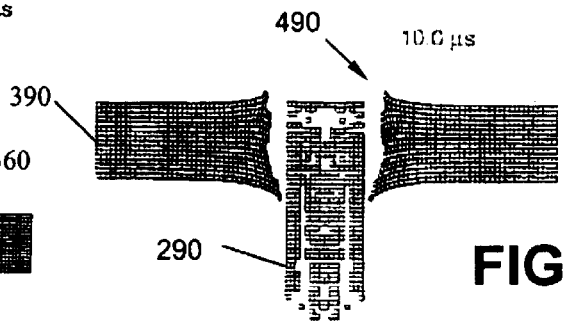

FIG. 5A illustrates penetrator 240 and target 340 with resulting crater 440 after 1.19 μsec. FIG. 5B ilustrates penetrator 250 and target 350 with resulting crater 450 after 1.60 μsec. FIG. 5C illustrates penetrator 260 and target 360 with resulting crater 460 after 2.39 μsec. FIG. 5D illustrates penetrator 270 and target 370 with elongated cavity 470 after 4.39 μsec. FIG. 5E illustrates penetrator 280 and target 380 with resulting fragmented cavity 480 after 6.0 μsec. FIG. 5F illustrates penetrator 290 and target 390 with resulting penetration cavity 490 after 10.0 μsec.

Figure 6A:
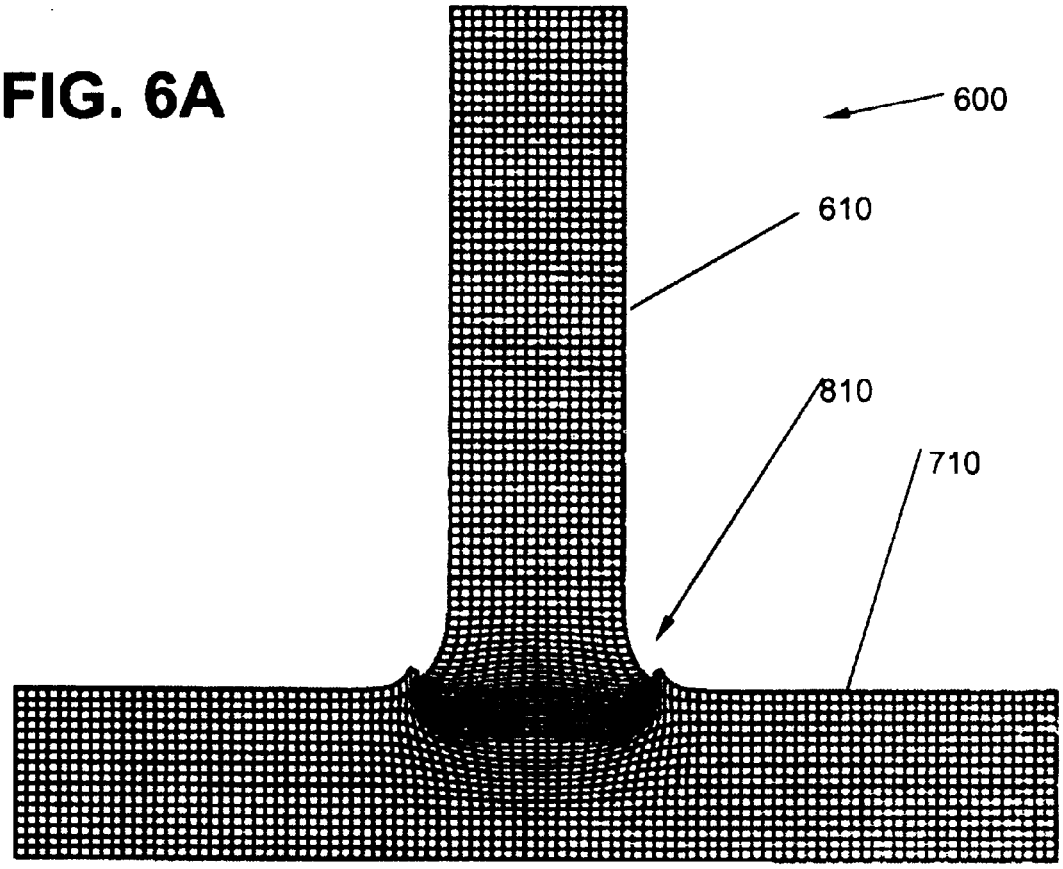
FIGS. 6A, 6B, 6C, 6D and 6E are finite element axi-symmetric cross-section views of a ceramic penetrator striking a tungsten target.
Figure 6B:
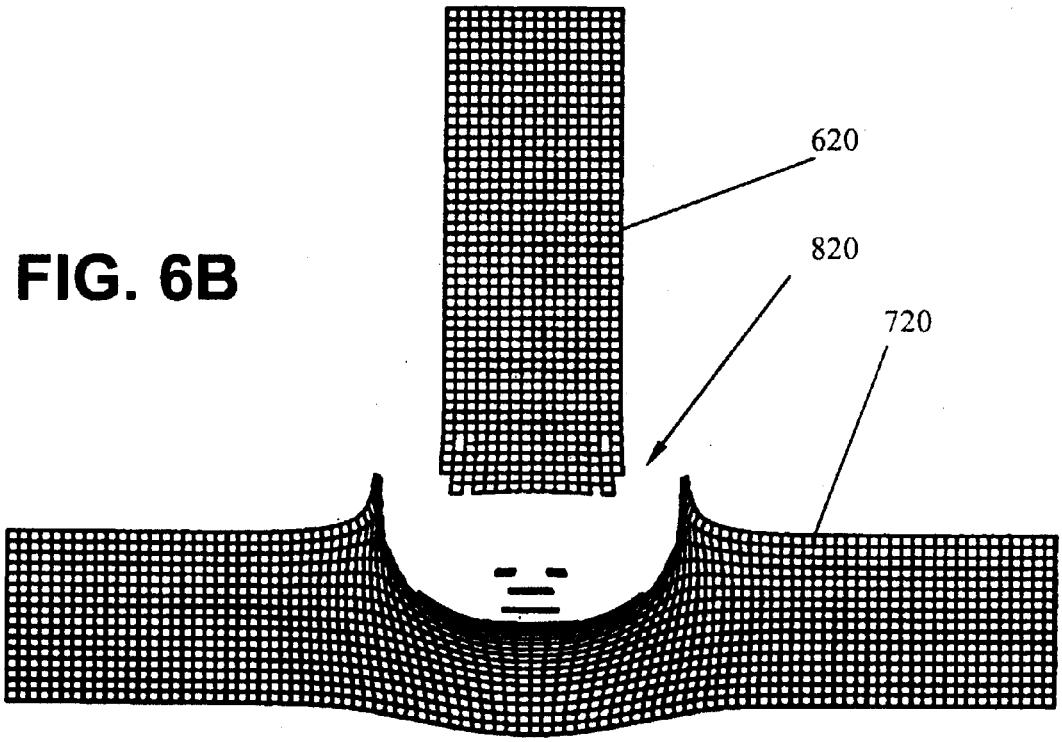
Figure 6C:
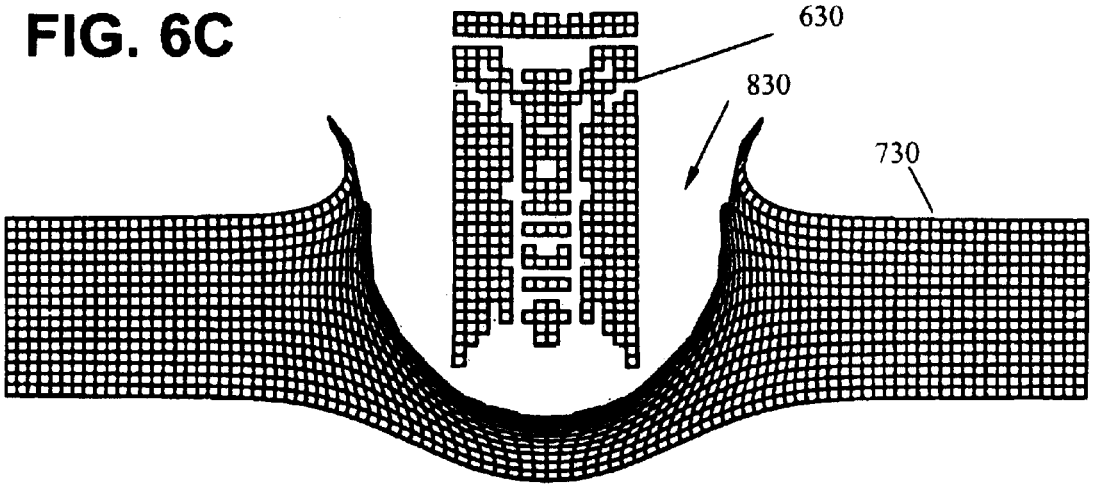

FIGS. 6A through 6E show a finite element model 600 with results of the flat tip AD- 85 ceramic penetrator after impacting a tungsten target at a velocity of 6.0 km/sec. FIG. 6A illustrates penetrator 610, target 710 and their interface 810 at 1.6 μsec after impact. FIG. 6B illustrates penetrator 620 and target 720 with the resulting crater 820 at 3.2 μsec after impact. FIG. 6C illustrates penetrator 630 and target 730 with the widening crater 830 at 6.4 μsec after impact. The deforming target at this high-speed impact behaves analogously to that of a fluid.

Figure 6D:
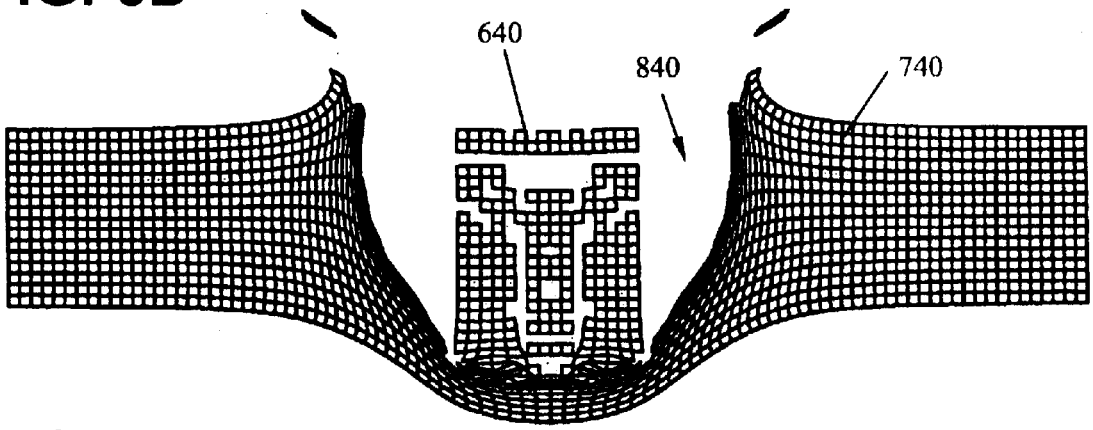
Figure 6E:
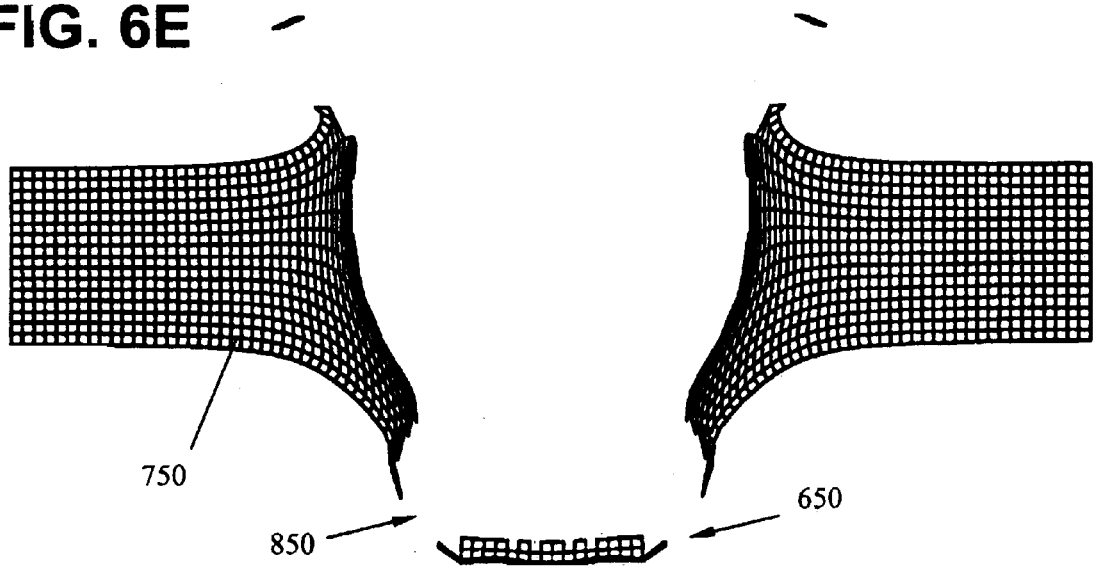

Similar to FIGS. 5A through 5F, FIGS. 6A through 6E show multiple impacts of the moving projectile and target. In particular, FIG. 6D illustrates crushed penetrator 630 against target 730 and the expanding crater 830 at 8.4 μsec after impact. FIG. 6E illustrates a subsequent impact of penetrator remnants 650 and target 730 and the through cavity 830 at 12.0 μsec after impact. Also, in similar fashion to the results from FIGS. 4A through 4C, target impact at higher speed induces more efficient penetration mechanism resulting in increased damage to the target. For a dense target material, such as tungsten, the projectile's disintegration leaves insufficient mass to penetrate secondary components within the target.

Figures 7A, 7B, 7C, 7D:
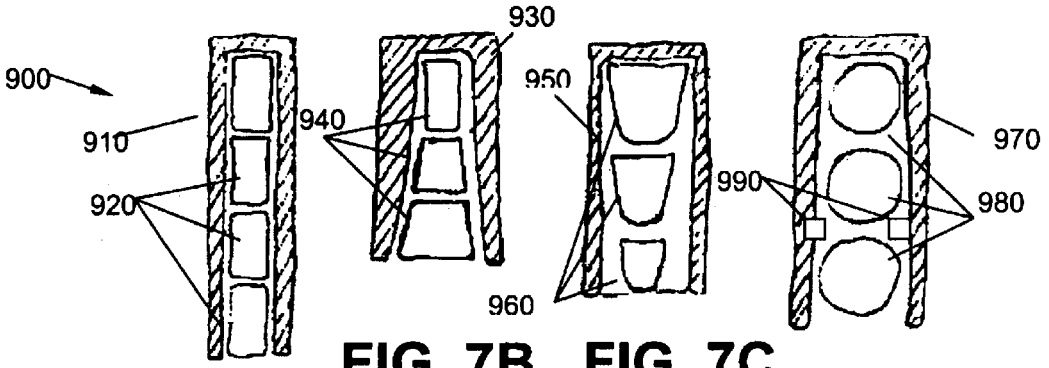
FIGS. 7A, 7B, 7C and 7D are elevation views of a shell containing penetrator components of various configurations.

FIGS. 7A through 7D show various stacking configurations 900 of the penetrator elements in an open case or containment shell. Specifically, FIG. 7A illustrates a first cylindrical case 910 containing a vertically concatenated series of cylindrical penetrator elements 920 of uniform diameter. FIG. 7B shows a second cylindrical case 930 containing penetrator elements 940 that widen towards the opening of the case. FIG. 7C shows a third cylindrical case 950 containing ogive-nose penetrator elements 940 that decrease in width towards the opening of the case. FIG. 7D shows a fourth cylindrical case 970 containing a vertically concatenated series of spherical penetrator elements 980 of uniform diameter. The gaps between the penetrator elements may contain an interface material, such as foam, and/or include a separation clamp 990 attached to the case 970.

In another embodiment, one or more high-strength penetrator elements may be encased in the shell 930, 950 that provides for residual compression of the penetrator elements along the longitudinal axis. Additionally, the shell may radially pre-compress these elements. The pre-compression state in ceramic and other brittle materials may reduce the influence of tensile waves induced in these materials upon impact and thus increases the integrity of the penetrator elements.

Upon contact with the target, the projectile's penetrator elements successively collide thereagainst. These separate concatenated strikes transfer discrete closely-spaced kinetic energy to facilitate deeper penetration. This effect may be considered analogous to repeated impacts from a jack-hammer on a concrete slab causing deepening localized damage to the concrete slab. The incorporation of ceramic materials for the penetrator elements further improves these penetration characteristics in comparison to metal, due to generally higher compressive strength of the former.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A projectile for engaging a target, comprising:

a shell having a longitudinal axis substantially perpendicular to an impact surface of the target; and a plurality of penetrator elements disposed in tandem in the shell along the longitudinal axis, wherein the plurality includes a fore penetrator element composed of a heavy metal, and at least one remaining penetrator element of the plurality is composed of ceramic.

2. The projectile according to claim 1, wherein the plurality is arranged to be axi-symmetric.

3. The projectile according to claim 2, wherein each penetrator element is cylindrical.

4. The projectile according to claim 2, wherein each penetrator element is spherical.

5. The projectile according to claim 2, wherein each penetrator element has a frustum shape.

6. The projectile according to claim 2, wherein each penetrator element has an ogive shape.

7. The projectile according to claim 2, wherein the plurality of penetrator elements includes first, second and third penetrator elements disposed fore to aft, the first penetrator element is a cone, the second penetrator element is a frustum, and the third penetrator element is a cylinder.

8. The projectile according to claim 1, wherein a furthest-aft penetrator element is composed of a frangible material.

9. The projectile according to claim 1, wherein first and second penetrator elements of the plurality have an interface gap therebetween.

10. The projectile according to claim 9, wherein the gap is filled with a shock-absorbing material.

11. The projectile according to claim 9, wherein the gap includes a clamp attached to the shell to constrain relative longitudinal translation between the first and second penetrator elements.

12. The projectile according to claim 1, wherein another at least one remaining element of the plurality of penetrator elements is composed of reactive material.

13. A projectile for engaging a target, comprising:

a shell having a longitudinal axis substantially perpendicular to an impact surface of the target; and a plurality of penetrator elements disposed in tandem in the shell along the longitudinal axis, wherein a foremost penetrator element of the plurality is composed of heavy metal and at least one remaining element of the penetrator elements is composed of ceramic.

14. The projectile according to claim 13, wherein first and second penetrator elements of the plurality have an interface gap therebetween.

15. The projectile according to claim 13, wherein the gap is filled with a shock-absorbing material.

16. The projectile according to claim 13, wherein another at least one remaining element of the plurality of penetrator elements is composed of reactive material.

17. A projectile for engaging a target, comprising:

a unitary penetrator element having a longitudinal axis disposed substantially perpendicular to an impact surface of the target, wherein the penetrator element is composed of ceramic.

18. The projectile according to claim 17, wherein the penetrator element is cylindrical about the longitudinal axis and includes a nose having a shape that is one of flat and ogive.

* * * * *